United States Patent [19]

Airhart

[11] 4,222,454
[45] Sep. 16, 1980

[54] BIDIRECTIONAL GROUND COUPLING MEANS FOR INCLINED SEISMIC SOURCE

[75] Inventor: Tom P. Airhart, Plano, Tex.

[73] Assignee: Atlantic Richfield Company, Los Angeles, Calif.

[21] Appl. No.: 307

[22] Filed: Jan. 2, 1979

[51] Int. Cl.³ .......................... G01V 1/04; G01V 1/10
[52] U.S. Cl. .................................... 181/117; 181/121; 181/401; 367/75
[58] Field of Search ............... 181/110, 113, 116, 117, 181/118, 121, 401; 367/75; 102/23, 34.21, 37.4, 37.52; 89/40 H, 42 A

[56] References Cited

U.S. PATENT DOCUMENTS

| | | | |
|---|---|---|---|
| 910,794 | 1/1909 | Defort | 89/40 H |
| 1,195,543 | 8/1916 | Wicker | 102/23 |
| 3,287,696 | 11/1966 | Chalet et al. | 181/121 |
| 3,372,770 | 3/1968 | Clynctt | 181/401 |
| 3,587,774 | 6/1971 | Bemrose et al. | 181/401 |
| 3,716,111 | 2/1973 | Lavergne | 367/75 |
| 3,835,954 | 9/1974 | Layotte | 181/401 |
| 4,059,820 | 11/1977 | Turpening | 367/75 |

FOREIGN PATENT DOCUMENTS

| | | | |
|---|---|---|---|
| 58341 | 10/1946 | Netherlands | 89/40.4 |
| 616602 | 7/1978 | U.S.S.R. | 367/75 |

*Primary Examiner*—Nelson Moskowitz
*Attorney, Agent, or Firm*—Robert M. Betz

[57] ABSTRACT

Apparatus for generating combined compressional and shear wave signals in the earth which employs a seismic source, such as a cylindrical gas exploder, having a free-moving wedge shaped base which tapers symmetrically downwardly to a thin blade. When the exploder is fired at an angle inclined to the vertical, a force is generated along its longitudinal axis which drives the base downwardly in the same direction so as to propagate seismic signals having a compressional component and a shear component. The blade is disposed transversely to the direction of the horizontal component of this applied force. The penetration achieved by the thin blade portion of the base insures sufficient earth coupling to generate high energy shear seismic signals and minimizes horizontal translation of the exploder under a wide range of soil conditions. The axial symmetry of the base permits the exploder to be rotated in place about a horizontal axis and fired a second time to generate seismic waves of equal magnitude and of opposite phase at the same point on the earth's surface.

7 Claims, 2 Drawing Figures

BIDIRECTIONAL GROUND COUPLING MEANS FOR INCLINED SEISMIC SOURCE

BACKGROUND OF THE INVENTION

I. Field of the Invention

This invention relates generally to the field of geophysical prospecting and more particularly to improved means for coupling the energy of a seismic source into the earth in a manner to generate combined compressional and shear seismic waves.

II. Prior Art

Prior art devices for generation of combined compressional and shear seismic waves in the earth typically employ some means for applying a downwardly directed force in a direction inclined to the vertical against a ground coupling member so that the resultant downward movement of such member in the direction of the applied force produces the requisite seismic waves. One example of this type of prior art device is illustrated in U.S. Pat. No. 4,059,820 to Turpening.

A disadvantage inherent in such prior art devices is the failure of the ground coupling to provide for adequate penetration into the earth under a variety of soil conditions to insure maximum efficiency of earth coupling for generation of shear seismic waves. In addition, the prior art has not focused specifically on the need for maintaining exact correspondence between the direction of the applied force and the direction of penetration of the ground contacting means regardless of the orientation of the force generation device.

The applicant's invention is therefore directed to the redesign of a ground coupling device for a seismic source to overcome the disadvantages referenced above.

SUMMARY OF THE INVENTION

In accordance with a preferred embodiment of this invention, ground coupling means for a cylindrical seismic source are provided which are slidably interfitted within the lower end of the source housing. The ground coupling means include a ground contacting base which is wedge shaped so that it tapers symmetrically about the longitudinal axis of the housing from a flat upper surface to a thin central blade. Preferably the blade consists of a plurality of adjacent co-planar replaceable teeth of hardened steel.

In use, the source housing is supported with its axis inclined to the vertical such that the face of the blade is transverse to the direction of the horizontal component of a downward axial force applied to the ground coupling means by the source and one of the two opposed convergent sides of the base rests on the earth's surface. Because of its axial symmetry, the base provides identical earth coupling characteristics when the seismic source is rotated about a horizontal axis so that it is inclined at the same angle to the vertical in an opposite sense. If the source is fired successively at the same point on the earth's surface at such oppositely directed inclinations, the magnitude of the resultant shear waves will be accurately duplicated for summation or cancellation purposes.

DESCRIPTION OF THE PREFERRED EMBODIMENT

Figure 1:
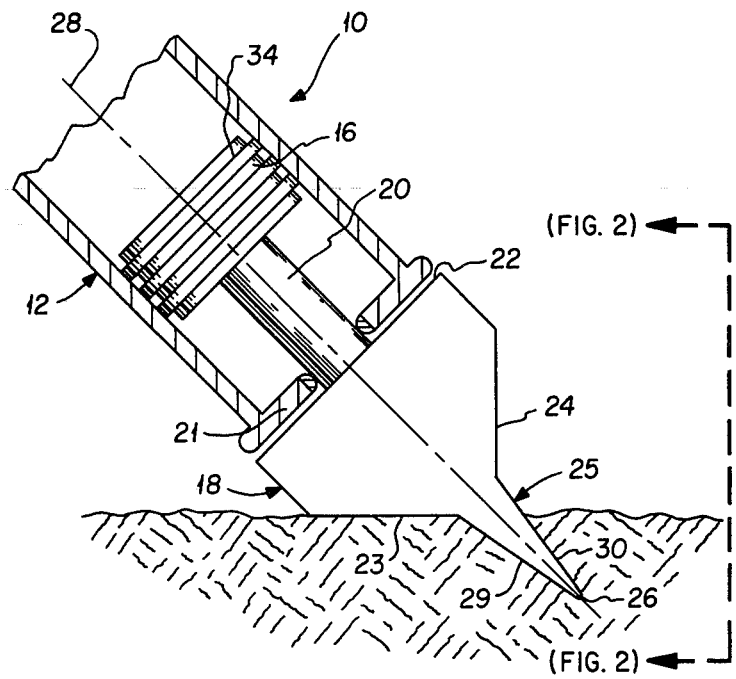
FIG. 1 is a detailed view, partially in section, of ground coupling means in accordance with a preferred embodiment of this invention shown interfitted within the lower end of any generalized form of cylindrical seismic source.
Figure 2:
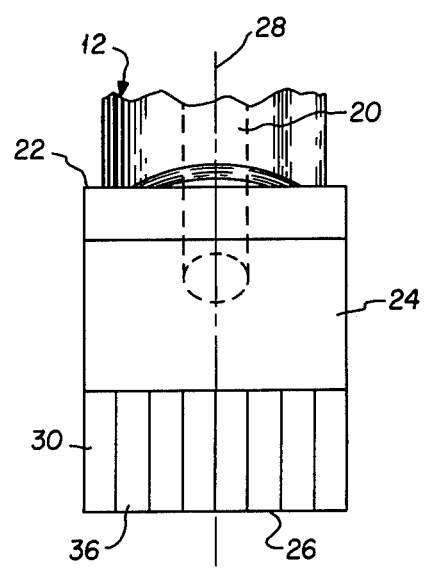
FIG. 2 is an elevation of the ground contact base of said ground coupling means taken along the line 2—2 of FIG. 1.

Referring now to the drawings, FIGS. 1 and 2 are fragmentary views of the lower end of any generally cylindrical seismic source 10 inclinable at an angle to the vertical. A piston 16 slidable within housing 12 is integrally connected with a wedge shaped ground contacting base 18 by means of shank 20 extending through the lower end 21 of housing 12. As shown, base 18 tapers downwardly in a wedge shaped manner from a rectangular upper surface 22 along opposed convergent sides 23 and 24 to an axial blade portion 25 terminating in leading edge 26. The width of the blade 25 extends along the longitudinal axis 28 of housing 12 so that leading edge 26 may conveniently be perpendicular to such axis. In this way, when the housing 12 is inclined at an angle to the vertical, for example, 45°, the leading edge 26 may be disposed horizontally while the faces 29 and 30 of the blade 25 lie transversely to the direction of the projection of such axis on the earth's surface. At the same time, either of convergent sides 23 or 24 is adapted to rest on the earth's surface depending on in which direction source 10 is inclined from the vertical. Suitable means through which source 10 may be supported in an inclined position as shown are varied and well known and form no part of this invention.

In operation, by means well known in the art, a force may be directed within housing 12 along the axis 28 transversely against the face 34 of piston 16, thereby thrusting base 18 into the earth in such axial direction. Since the base 18 is rigidly interconnected with the piston 16, and because piston 16 is constrained to align with the direction of axis 28, the resultant downward motion of the base 18 always coincides precisely with the direction of the applied force, regardless of the inclination of the seismic source 10. Further, the depth of penetration of thin blade 25 depends upon the yieldability of the soil at the point of impact. However produced, the penetration of the blade 25 causes a progressively greater area of surface contact between the earth and the forward face 24 of blade portion 25 and eventually with upper convergent side 24. In this manner a highly efficient earth couple is achieved under a variety of conditions to produce a high energy shear wave seismic signal component. At the same time, the downward component of motion of base 18 insures a good longitudinal compression signal generation at the interface between side 23, face 29 of blade 25 and the earth.

In order to propagate phase-reversed seismic signals of the type described at a point on the earth's surface, the source 10 may be rotated about a horizontal axis until housing 12 reaches the same inclination in an opposite sense and fired again. The symmetry of the base 18 about the axis 28 insures that the faces 29 and 30 and the convergent sides 23 and 24 will now reverse their previous positions as shown with respect to the earth. This equivalence insures that the magnitude of the important shear wave component as well as the compressional component of the resultant seismic signal will be duplicated from the first to the second firing of source 10.

Preferably the blade 25 consists of a plurality of adjacent co-planar replaceable teeth 36 which may, for example, be of hardened steel. However, blade 25 may, if desired, be a single solid element or it may be an integral part of base 18.

The seismic source 10, within the scope of this intention may be a seismic gas exploder of well known construction and mode of operation. It may also be any other force generator such as an air gun or a vibrator adapted to furnish a downward impulse or a series of impulses to a wedge shaped member such as base 18, with or without the addition of the thin blade 26. It further includes devices which use the pressure of expanding gases to propel a solid projectile into contact with piston 16.

It should be understood that a device in accordance with this invention is usable for the generation of both horizontal and vertical shear waves, the specific measurements to be made being a matter of choice.

What is claimed is:

1. In apparatus for generating combined compressional and shear seismic waves in the earth including a seismic source adapted to direct a downward force along an axis inclined to the vertical, the improved means for coupling the energy of said source into the earth comprising a wedge-shaped ground contacting member having at least two opposed sides convergent symmetrically about said axis to an edge, either of said sides being adapted to rest on the earth's surface when said axis is so inclined.

2. Coupling means as in claim 1 wherein a thin blade coextensive with said edge projects downwardly therefrom along said axis.

3. In apparatus for generating combined compressional and shear seismic waves in the earth including a cylindrical seismic source housing inclinable at an angle to the vertical and adapted to generate a downward force along its longitudinal axis, the improved means for coupling the energy of said source into the ground comprising a piston slidable within said housing and adapted to be displaced by said downward force, and a ground contact base rigidly interconnected with said piston, said base having a wedge shape such that it tapers downwardly to an edge.

4. Apparatus as in claim 3 wherein said base comprises two opposed sides convergent symmetrically about said axis toward said edge, either of said sides being adapted to rest on the earth's surface when said housing is inclined at said angle.

5. Apparatus as in claim 4 wherein said convergent sides lie at right angles to each other.

6. Apparatus as in claim 3 wherein a thin blade coextensive with said edge projects downwardly therefrom along said axis.

7. Apparatus as in claim 6 wherein said blade comprises a plurality of adjacent co-planar teeth.

* * * * *